United States Patent
Seuss

(10) Patent No.: US 10,380,252 B2
(45) Date of Patent: *Aug. 13, 2019

(54) SYSTEMS AND METHODS FOR ANALYZING DOCUMENT COVERAGE

(71) Applicant: NORTHERN LIGHT GROUP, LLC, Boston, MA (US)

(72) Inventor: C. David Seuss, Charlestown, MA (US)

(73) Assignee: NORTHERN LIGHT GROUP, LLC, Boston, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/399,991

(22) Filed: Jan. 6, 2017

(65) Prior Publication Data

US 2017/0116176 A1    Apr. 27, 2017

Related U.S. Application Data

(63) Continuation of application No. 14/472,246, filed on Aug. 28, 2014, now Pat. No. 9,575,961.

(51) Int. Cl.
*G06F 17/27* (2006.01)
*G06F 17/30* (2006.01)
(Continued)

(52) U.S. Cl.
CPC ............ *G06F 17/278* (2013.01); *G06F 16/00* (2019.01); *G06F 16/313* (2019.01); *G06F 16/93* (2019.01);
(Continued)

(58) Field of Classification Search
CPC ......... G06F 17/21; G06F 17/271; G06F 17/30
See application file for complete search history.

(56) References Cited

U.S. PATENT DOCUMENTS

| 5,924,090 A | 7/1999 | Krellenstein |
| 6,134,553 A | 10/2000 | Jacobson et al. |

(Continued)

OTHER PUBLICATIONS

Benjamin, Victor et al., "Evaluating text visualization: An experiment in authorship analysis", 2013 IEEE International Conference on Intelligence and Security Informatics, IEEE, Jun. 4, 2013, pp. 16-20.

(Continued)

*Primary Examiner* — Pierre Louis Desir
*Assistant Examiner* — Yi Sheng Wang
(74) *Attorney, Agent, or Firm* — Lando & Anastasi, LLP

(57) ABSTRACT

A method includes storing a meaning taxonomy including meaning loaded entities and associations between the meaning loaded entities and a plurality of syntactic structures; receiving, from a first source, first content including one or more first syntactic structures; identifying, based at least in part on identification criteria, one or more meaning loaded entities that are linked to the one or more first syntactic structures by one or more first associations of the plurality of associations, the identification criteria including at least one of a type of the first content, a document size of the first content, a publication date of the first content, and an importance of the meaning load entities; calculating a first content summary indicating a level of coverage of the meaning loaded entities within the first content; and generating a first visual representation of the first content summary.

20 Claims, 8 Drawing Sheets

(51) Int. Cl.
*G06F 11/20* (2006.01)
*G06F 17/21* (2006.01)
*G06F 16/00* (2019.01)
*G06F 16/93* (2019.01)
*G06F 16/31* (2019.01)
*G06Q 10/00* (2012.01)
*G06T 11/60* (2006.01)
*G06T 11/20* (2006.01)

(52) U.S. Cl.
CPC ............ *G06F 17/21* (2013.01); *G06F 17/271* (2013.01); *G06F 17/274* (2013.01); *G06F 17/2785* (2013.01); *G06Q 10/00* (2013.01); *G06T 11/206* (2013.01); *G06T 11/60* (2013.01)

(56) References Cited

U.S. PATENT DOCUMENTS

| | | | |
|---|---|---|---|
| 6,295,529 B1 | 9/2001 | Corston-Oliver et al. |
| 6,349,307 B1 | 2/2002 | Chen |
| 6,549,897 B1 | 4/2003 | Katariya et al. |
| 6,606,620 B1 | 8/2003 | Sundaresan et al. |
| 6,789,230 B2 | 9/2004 | Katariya et al. |
| 6,901,399 B1 | 5/2005 | Corston et al. |
| 6,901,402 B1 | 5/2005 | Corston-Oliver et al. |
| 7,139,752 B2 | 11/2006 | Broder et al. |
| 7,146,361 B2 | 12/2006 | Broder et al. |
| 7,188,106 B2 | 3/2007 | Dwork et al. |
| 7,231,612 B1 | 6/2007 | Mani et al. |
| 7,269,594 B2 | 9/2007 | Corston-Oliver et al. |
| 7,286,130 B2 | 10/2007 | Iguchi et al. |
| 7,877,344 B2 | 1/2011 | Seuss |
| 7,996,210 B2 | 8/2011 | Godbole et al. |
| 8,245,135 B2 | 8/2012 | Cai et al. |
| 8,271,266 B2 | 9/2012 | Gallagher et al. |
| 8,276,065 B2 | 9/2012 | Huang et al. |
| 8,340,957 B2 | 12/2012 | Gallagher et al. |
| 8,407,215 B2 | 3/2013 | Sheedy et al. |
| 8,583,580 B2 | 11/2013 | Seuss |
| 2003/0154071 A1 | 8/2003 | Shreve |
| 2004/0107102 A1* | 6/2004 | Chung ............... G10L 13/10 704/260 |
| 2005/0060288 A1 | 3/2005 | von Groll |
| 2006/0010373 A1 | 1/2006 | Burns |
| 2008/0021925 A1 | 1/2008 | Sweeney |
| 2009/0099993 A1* | 4/2009 | Seuss ............... G06N 5/022 706/47 |
| 2009/0157382 A1 | 6/2009 | Bar |
| 2010/0079464 A1 | 4/2010 | Matsumura |
| 2011/0119271 A1* | 5/2011 | Seuss ............... G06N 5/022 707/738 |
| 2011/0231416 A1 | 9/2011 | Goodchild Drake |
| 2013/0204876 A1 | 8/2013 | Szucs et al. |
| 2016/0062986 A1* | 3/2016 | Seuss ............... G06F 17/21 704/9 |
| 2017/0083614 A1* | 3/2017 | Seuss ............... G06F 16/334 |

OTHER PUBLICATIONS

International Search Report and Written Opinion from corresponding International Application No. PCT/US2015/047149 dated Jan. 20, 2016.

* cited by examiner

SYSTEMS AND METHODS FOR ANALYZING DOCUMENT COVERAGE

CROSS REFERENCE TO RELATED APPLICATIONS

This application claims the benefit under 35 U.S.C. § 120 as a continuation of U.S. application Ser. No. 14/472,246, filed Aug. 28, 2014 and titled "SYSTEMS AND METHODS FOR ANALYZING DOCUMENT COVERAGE," which is incorporated herein by reference in its entirety.

NOTICE OF MATERIAL SUBJECT TO COPYRIGHT PROTECTION

Portions of the material in this patent document are subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

Technical Field

The technical field of this disclosure relates generally to content analysis and, more specifically, to semantic analysis of documents produced by one or more sources.

Discussion

Conventional computerized tools for semantic analysis process large bodies of documents to identify topics discussed therein. This processing often includes parsing text stored in the documents and creating a data store that associates documents with their constituent terms and the frequency with which the constituent terms occur within the documents. From this data store, conventional semantic analysis tools rank terms by frequency of occurrence and record terms that occur less frequently than others as being more important. Conventional semantic analysis tools focus on these important terms and their location within documents relative to other terms to discern the topics to which the documents are directed. Examples of processing techniques utilized within conventional semantic analysis tools include latent Dirichlet allocation and probabilistic latent semantic indexing.

SUMMARY

Various aspects provide facilities to analyze content to determine the key foundational concepts addressed therein and summarize these concepts using easily understood metrics and visual representations. For instance, according to some aspects, the facilities evaluate a corpus of documents to determine which documents address one or more concepts of interest. These concepts may be, for example, concepts selected by a user of the facilities or concepts generated from the corpus that meet some predefined criteria (e.g., concepts most frequently addressed in the corpus, common concepts shared between two corpora, concepts from content created by an identified source, etc.). According to at least one aspect, the metrics calculated to summarize these concepts include a variety of statistical metrics (e.g., average, sums, variance, standard deviation, etc.). Further, according to this aspect, the visual representations include the calculated metrics within the context of other visual indicia that enable a user to quickly discern the domain of concepts addressed in the corpus and the level of coverage dedicated to each concept.

Other aspects provide facilities to analyze content generated from multiple, distinct sources and to summarize concepts addressed in the content in a comparative fashion. For instance, according to one aspect, the facilities evaluate corpora of documents generated by a plurality of source entities, such as individuals, academic institutions, corporations, reporters, analysts, and other content sources. Within these aspects, the facilities provide comparative representations of calculated metrics, enabling users to easily comprehend the domain of concepts and depth of coverage given to each concept by each content source.

According to one aspect, a system is provided. The system includes memory storing a meaning taxonomy including a plurality of meaning loaded entities, and a plurality of associations between the plurality of meaning loaded entities and a plurality of syntactic structures, each association of the plurality of associations linking at least one meaning loaded entity of the plurality of meaning loaded entities to at least one syntactic structure of the plurality of syntactic structures; and at least one processor in data communication with the memory, the processor configured to receive first content from a first source, the first content including one or more first syntactic structures; identify, based at least in part on identification criteria, one or more first meaning loaded entities of the plurality of meaning loaded entities that are linked to the one or more first syntactic structures by one or more first associations of the plurality of associations, the identification criteria including at least one of a type of the first content, a document size of the first content, a publication date of the first content, and an importance of the one or more first meaning load entities; calculate a first content summary indicating a first level of coverage of the one or more first meaning loaded entities within the first content; and generate a first visual representation of the first content summary, the first visual representation comprising visual indicia that graphically represent a domain of the one or more first meaning loaded entities addressed in the first content and a level of coverage dedicated to each meaning loaded entity in the domain of meaning loaded entities addressed in the first content.

According to one embodiment, the type of the first content is one of textual content, graphical content, and audio content.

According to another embodiment, the first content includes a set of documents including the one or more first syntactic structures and the first content summary includes a depth of coverage of the one or more first meaning loaded entities within the set of documents. According to a further embodiment, the set of documents includes at least one of white papers, presentations, news articles, press releases, market research reports, websites, and social media feeds. According to yet a further embodiment, the first visual representation is a radar chart presenting the depth of coverage.

According to one embodiment, the one or more components are further collectively configured to receive second content from a second source, the second content including one or more second syntactic structures; identify one or more second meaning loaded entities of the plurality of meaning loaded entities that are linked to the one or more second syntactic structures by one or more second associations of the plurality of associations; calculate a second content summary indicating a second level of coverage of the one or more second meaning loaded entities within the second content; and provide a comparative representation that combines the first visual representation and a second representation of the second content summary to the external entity. According to a further embodiment, the first content summary and the second content summary indicate a level of coverage of at least one common meaning loaded entity extracted from the first content and the second content. According to yet a further embodiment, the one or more first syntactic structures and the one or more second syntactic structures share no common syntactic structures.

According to another aspect, a method implemented using a computer system including memory and at least one processor coupled to the memory is provided. The method includes storing, in the memory, a meaning taxonomy including a plurality of meaning loaded entities; and a plurality of associations between the plurality of meaning loaded entities and a plurality of syntactic structures, each association of the plurality of associations linking at least one meaning loaded entity of the plurality of meaning loaded entities to at least one syntactic structure of the plurality of syntactic structures; receiving first content generated by a first source, the first content including one or more first syntactic structures; identifying, based at least in part on identification criteria, one or more first meaning loaded entities of the plurality of meaning loaded entities that are linked to the one or more first syntactic structures by one or more first associations of the plurality of associations, the identification criteria including at least one of a type of the first content, a document size of the first content, a publication date of the first content, and an importance of the one or more first meaning load entities; calculating a first content summary indicating a first level of coverage of the one or more first meaning loaded entities within the first content; and generating, by the at least one processor, a first visual representation of the first content summary, the first visual representation comprising visual indicia that graphically represent a domain of the one or more meaning loaded entities addressed in the first content and a level of coverage dedicated to each meaning loaded entity.

According to one embodiment, the type of the first content is one of textual content, graphical content, and audio content.

According to another embodiment, receiving the first content includes receiving a set of documents including the one or more syntactic structures and calculating the first content summary includes calculating a depth of coverage of the one or more first meaning loaded entities within the set of documents. According to a further embodiment, receiving the set of documents includes receiving at least one of white papers, presentations, news articles, press releases, market research reports, websites, and social media feeds.

According to one embodiment, the first visual representation is a radar chart presenting the depth of coverage. According to another embodiment, the method includes receiving second content generated by a second source, the second content including one or more second syntactic structures; identifying one or more second meaning loaded entities of the plurality of meaning loaded entities that are linked to the one or more second syntactic structures by one or more second associations of the plurality of associations; calculating a second content summary indicating a second level of coverage of the one or more second meaning loaded entities within the second content; and providing a comparative representation that combines the first visual representation and a second representation of the second content summary to the external entity. According to a further embodiment, calculating the second content summary includes calculating a second content summary that indicates a level of coverage of at least one common meaning loaded entity extracted from the first content and the second content. According to yet a further embodiment, identifying the one or more second meaning loaded entities includes identifying one or more second meaning loaded entities that are linked to one or more second syntactic structures that share no common syntactic structures with the one or more first syntactic structures.

According to another aspect, a non-transitory computer readable medium storing sequences of instruction for analyzing coverage of concepts within content, the sequences of instruction including computer executable instructions that instruct at least one processor to store, in a memory in data communication with the at least one processor, a meaning taxonomy including a plurality of meaning loaded entities; and a plurality of associations between the plurality of meaning loaded entities and a plurality of syntactic structures, each association of the plurality of associations linking at least one meaning loaded entity of the plurality of meaning loaded entities to at least one syntactic structure of the plurality of syntactic structures; receive first content from a first source, the first content including one or more first syntactic structures; identify, based at least in part on identification criteria, one or more first meaning loaded entities of the plurality of meaning loaded entities that are linked to the one or more first syntactic structures by one or more first associations of the plurality of associations, the identification criteria including at least one of a type of the first content, a document size of the first content, a publication date of the first content, and an importance of the one or more first meaning load entities; calculate a first content summary indicating a first level of coverage of the one or more first meaning loaded entities within the first content; and generate a first visual representation of the first content summary, the first visual representation comprising visual indicia that graphically represent a domain of the first one or more meaning loaded entities in the first content and a level of coverage dedicated to each meaning loaded entity.

According to one embodiment, the first content includes a set of documents including the one or more syntactic structures and the first content summary includes a depth of coverage of the one or more first meaning loaded entities within the set of documents. According to a further embodiment, the set of documents includes at least one of white papers, presentations, news articles, press releases, market research reports, websites, and social media feeds. According to another embodiment, the instructions further instruct the at least one processor to receive second content from a second source, the second content including one or more second syntactic structures; identify one or more second meaning loaded entities of the plurality of meaning loaded entities that are linked to the one or more second syntactic structures by one or more second associations of the plurality of associations; calculate a second content summary indicating a second level of coverage of the one or more second meaning loaded entities within the second content; and provide a comparative representation that combines the first visual representation and a second representation of the second content summary to the external entity.

Still other aspects, embodiments and advantages of these example aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment. References to "an embodiment," "an example," "some embodiments," "some examples," "an alternate embodiment," "various embodiments," "one embodiment," "at least one embodiment," "this and other embodiments" or the like are not necessarily mutually exclusive and are intended to indicate that a particular feature, structure, or characteristic described in connection with the embodiment may be included in at least one embodiment. The appearances of such terms herein are not necessarily all referring to the same embodiment.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1:
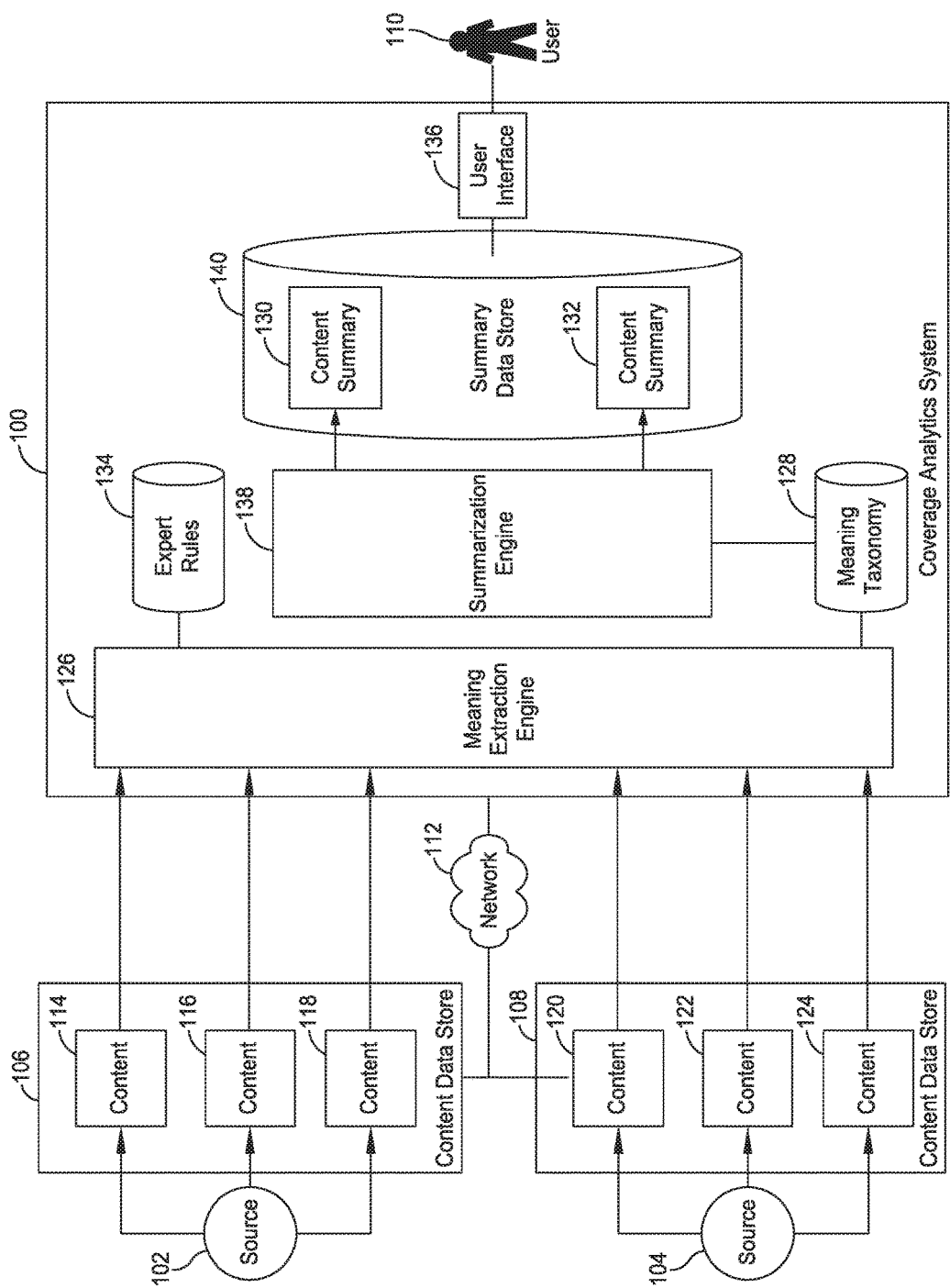
FIG. 1 is a block diagram of a coverage analytics system within the context of several external entities with which the coverage analytics system interoperates.

Some embodiments disclosed herein include apparatus and processes that implement a coverage analytics system that is configured to determine a domain of concepts addressed in content including a plurality of documents. For example, according to some embodiments, a specially configured computer system (i.e., a coverage analytics system) is configured to receive electronic documents and extract meaning from the documents using a meaning extraction engine. Some examples of meaning extraction tools and techniques are described in U.S. Pat. No. 7,877,344, titled "METHOD AND APPARATUS FOR EXTRACTING MEANING FROM DOCUMENTS USING A MEANING TAXONOMY COMPRISING SYNTACTIC STRUCTURES," issued Jan. 25, 2011, and U.S. Pat. No. 8,583,580, titled "METHOD AND APPARATUS FOR IDENTIFYING AND EXTRACTING MEANING IN DOCUMENTS," issued Nov. 12, 2013 (the '580 patent), each of which is hereby incorporated herein by reference in its entirety.

In some embodiments, the coverage analytics system is further configured to summarize the extracted meaning into a variety of metrics and visualized representations. These metrics and representations provide indications as to the domain of concepts addressed in the documents and the depth of coverage given each concept. In addition, in at least one embodiment, the coverage analytics system is also configured to provide a comparative analysis of the extracted meaning via the metrics and visualized representations. Thus, the embodiment described herein provide a user with summarized information descriptive of a variety of content sources, the concepts of documents generated by these sources, and the coverage given to each concept by each source.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Coverage Analytics System

Some embodiments disclosed herein implement a coverage analytics system using one or more computer systems, such as the computer systems described below with reference to FIG. 2. According to these embodiments, a coverage analytics system analyzes documents generated by one or more sources for concepts addressed within the documents and provides information descriptive of these concepts. FIG. 1 illustrates an example coverage analytics system 100 within the context of several external entities that interoperate with the coverage analytics system 100. As shown, FIG. 1 includes the coverage analytics system 100, a user 110, content sources 102 and 104, content data stores 106 and 108, and a communications network 112. The content data store 106 includes content 114, 116, and 118. The content data store 108 includes content 120, 122, and 124. The coverage analytics system 100 includes a meaning extraction engine 126, a summarization engine 138, a meaning taxonomy 128, expert rules 134, a summary data store 140, and a user interface 136. The summary data store 140 stores content summaries 130 and 132.

As illustrated in FIG. 1, the coverage analytics system 100 and the content data stores 106 and 108 exchange (i.e. transmit or receive) information via the network 112. The network 112 may include any communication network through which computer systems exchange information. For example, the network 112 may be a public network, such as the Internet, and may include other public or private networks such as LANs, WANs, extranets, intranets, and cloud computing systems. The network 112 may also include cellular networks such as LTE, 4G, HSDPA/HSUPA, TD-SCDMA, W-CDMA, CMDA, WiFi, Bluetooth, EvDO, GSM, and iDEN networks. Although shown as a single network in FIG. 1, in some embodiments, the network 112 includes a plurality of communication networks.

According to one embodiment illustrated by FIG. 1, the content sources 102 and 104 generate content stored in the content data stores 106 and 108. The content sources 102 and 104 may be any of a variety of entities, such as news agencies, research institutions, businesses, business analysts, bloggers, academics, etc. The content may include textual information, graphical information, music, and other forms of content. For instance, the content may include one or more electronic documents. These electronic documents, in turn, may be made up of various syntactic structures that embody semantic meaning. As referred to herein, syntactic structures include any set of symbols from which semantic meaning may be interpreted. A non-limiting list of example syntactic structures includes characters, words, phrases, clauses, sentences, paragraphs and pages. The semantic meaning of one or more syntactic structures may depend not only on the symbols included in the syntactic structure, but also on the context of the syntactic structure, e.g. its relationship to other syntactic structures.

In some embodiments, the meaning taxonomy 128 serves as the basis for an analytical framework used to extract meaning from content stored in the content sources 102 and 104. In these embodiments, the meaning taxonomy 128 includes a plurality of direct and indirect associations between syntactic structures and meaning loaded entities. As referred to herein a meaning loaded entity is a key foundational concept of an information domain being analyzed. Meaning loaded entities are often complex or specialized concepts. In some embodiments, the meaning taxonomy 128 also defines various non-normalized syntactic structures that when present in a document indicate the document addresses a particular meaning loaded entity. Further, in these embodiments, the meaning taxonomy 128 identifies various syntactic structures that are used to normalize the non-normalized syntactic structures. Both the normalized and non-normalized syntactic structures may be associated with meaning loaded entities.

In some embodiments, the meaning taxonomy 128 includes multiple layers of syntactic structures and associated meaning loaded entities arranged in various ways. For example, in one embodiment, these layers are hierarchical in nature. Further, the meaning loaded entities may be positioned at various locations within the meaning taxonomy. Thus, the specific configuration of any meaning taxonomy 128 depends upon the information domain being analyzed and the meaning loaded entities that the information domain expert wishes to use for automatic, repeatable expert analysis, or categorization. The flexible form and substance of the meaning taxonomy 128 enables an expert to encode his information domain knowledge into the coverage analytics system 100 in the manner most beneficial for application of an expert rule set, which is described further below.

Table 1 shows an example meaning taxonomy that is focused in the area of business management.

TABLE 1

| Non-normalized Syntactic Structure | Meaning Loaded Entity | Position in Meaning Taxonomy |
|---|---|---|
| announced a partnership | Business Partnerships | Business Partnerships |
| business partners | Business Partnerships | Business Partnerships |
| Formed a partnership with | Business Partnerships | Business Partnerships |
| channel partners | Channel Partnerships | Business Partnerships |
| development partners | Development Partnerships | Business Partnerships |
| distribution partners | Distribution Partnerships | Business Partnerships |
| financial partners | Financial Partnerships | Business Partnerships |
| marketing partners | Marketing Partnerships | Business Partnerships |
| strategic partners | Strategic Partnerships | Business Partnerships |
| Cash cow | Cash Cow | Corporate Strategy |
| Close follower | Close Follower | Corporate Strategy |
| ahead of the market | Innovation | Corporate Strategy |
| defining the future | Innovation | Corporate Strategy |
| defining the platform | Innovation | Corporate Strategy |
| Innovative | Innovation | Corporate Strategy |
| Innovator | Innovation | Corporate Strategy |
| Is innovating | Innovation | Corporate Strategy |
| is the future | Innovation | Corporate Strategy |
| new breed | Innovation | Corporate Strategy |
| controls the market | Market Leadership | Corporate Strategy |
| industry leader | Market Leadership | Corporate Strategy |
| leadership position | Market Leadership | Corporate Strategy |
| Leading the market | Market Leadership | Corporate Strategy |
| Market control | Market Leadership | Corporate Strategy |
| Market leader | Market Leadership | Corporate Strategy |
| Market leadership | Market Leadership | Corporate Strategy |
| Market leading | Market Leadership | Corporate Strategy |
| Market share leader | Market Leadership | Corporate Strategy |
| Rising star | Market Leadership | Corporate Strategy |
| has the best technology | Technology Leadership | Corporate Strategy |
| Leading technology | Technology Leadership | Corporate Strategy |
| technology leader | Technology Leadership | Corporate Strategy |
| acquisition strategy | Acquisitions | Corporate Strategy |
| M&A | Acquisitions | Corporate Strategy |
| mergers and acquisitions | Acquisitions | Corporate Strategy |
| Benchmark | Benchmarks | Best Practices |
| best practices | Best Practices | Best Practices |
| thought leader | Thought Leader | Best Practices |

In some embodiments, the expert rules 134, when applied to content, such as one or more documents, extract meaning from the content in the form of expert analysis. For instance, in one embodiment, individual expert rules are associated with one or more meaning loaded entities within the meaning taxonomy. As will be discussed later, expert rules that are associated with a meaning loaded entity may cause content, such as documents, to be associated with that meaning loaded entity. Thus, in some embodiments, content may be associated with a meaning loaded entity by virtue of a non-normalized syntactic structure included in the document or by operation of an expert rule.

In another embodiment, the expert rules 134 include one or more queries. These queries identify specific documents as being of interest if a logical proposition, composed of meaning loaded entities, syntactic structures and operators, evaluates to true when applied to the specific documents. The logical proposition may be, for example, a logical implication (i.e., an if-then statement). The logical proposition may include one or more logical operators. A non-limiting list of the logical operators that may be used in these logical propositions includes "and", "or", "xor" and "and-not." The logical propositions may include other operators as well. For example, in one embodiment comparison operators, such as "<", ">" and "=" may be used. In still another embodiment, a proximity operator may be used that will evaluate as true if a meaning loaded entity or any syntactic structure appears within a configurable proximity from a another meaning loaded entity or syntactic structure. Still another operator may evaluate as true if a particular meaning loaded entity or any syntactic structure appears multiple times within a configurable span of a document.

As a result of these capabilities, the expert rules 134 may associate an identified meaning loaded entity with a document based on that document being associated with another, identified meaning loaded entity. Moreover, the expert rules 134 may associate an identified meaning loaded entity with a document not associated with another, identified meaning loaded entity, or any document associated with a first meaning loaded entity, but not a specific syntactic structure. In another embodiment, the expert rules 134 associate an identified meaning loaded entity with documents associated with two or more other identified meaning loaded entities. In still another embodiment, the expert rules 134 associate an identified meaning loaded entity with documents associated with two or more meaning loaded entities having corresponding syntactic structures within a specified proximity of one another with the documents. This configurability of the expert rules 134 gives an information domain expert a variety of tools with which to analyze and categorize content.

Returning to an example illustrated by FIG. 1, the content 114, 116, 118, 120, 122, and 124 each include one or more electronic documents. Each of these documents includes various syntactic structures that map, directly or indirectly, to one or more meaning loaded entities within the meaning taxonomy 128. For instance, in one example, the documents included in content 114, 122, and 124 each include syntactic structures that map to a first meaning loaded entity (e.g., the concept of tablet computing), and the documents 116, 118, and 120 each include syntactic structures that map to a second meaning loaded entity (e.g., the concept of business strategy).

In another embodiment, the coverage analytics system 100 is configured to receive content from the content data stores 106 and 108 and process the content to generate and store the content summaries 130 and 132. When executing according to this configuration, the coverage analytics system 100 instantiates the meaning extraction engine 126 and the summarization engine 138. The meaning extraction engine 126 is configured to receive content, such as any of the content 114-124, and map syntactic structures within the received content to one or more meaning loaded entities stored in the meaning taxonomy 128. In performing this mapping, the meaning extraction engine 126 creates and stores associations between the content and the meaning loaded entities via the mapped syntactic structures. Thus, in this embodiment, documents are associated with meaning loaded entities via associations between syntactic structures included in the documents and the meaning loaded entities.

Next, the summarization engine 138 uses information regarding the extracted meaning loaded entities (e.g., number of documents addressing the extracted concepts, the density with which documents address the extracted concepts, the source that generated the document, etc.) to calculate summary metrics. The summarization engine 138 also stores the summary metrics, along with information supporting the summary metrics, in the summary data store 140 as the content summaries 130 and 132. For example, the content summary 130 may include summary information regarding the concept of business strategy and the content summary 132 may include summary information regarding the concept of laptop computing. Additional examples of processes and actions that the coverage analytics system 100 and its components are configured to execute are described further below with reference to FIGS. 3-5.

In an embodiment illustrated by FIG. 1, the user 110 interacts (e.g., provides input or receives output) with the user interface 136. In some embodiments illustrated by FIG. 1, the user interface 136 is a browser-based user interface served by the coverage analytics system 100. In other embodiments, the user interface 136 includes specialized client programs that execute outside of a browser environment, such as an application program executing on a mobile device. The user interface 136 may be implemented using a variety of technologies and may include sundry elements (e.g., screens, windows, buttons, boxes, etc) arranged according to various user interface metaphors.

Figure 6:
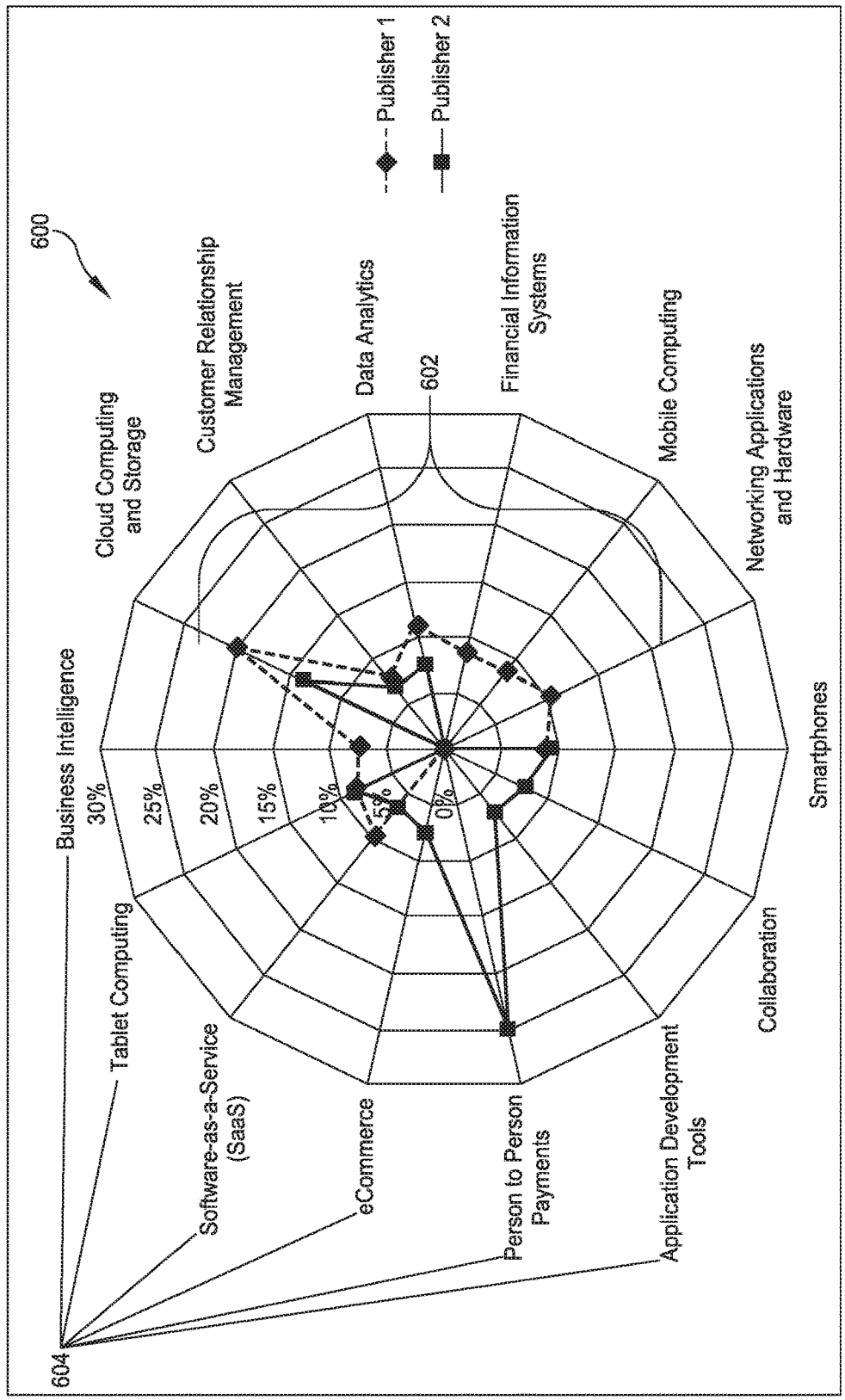
FIG. 6 is a visual representation generated by a coverage analytics system.
Figure 7:
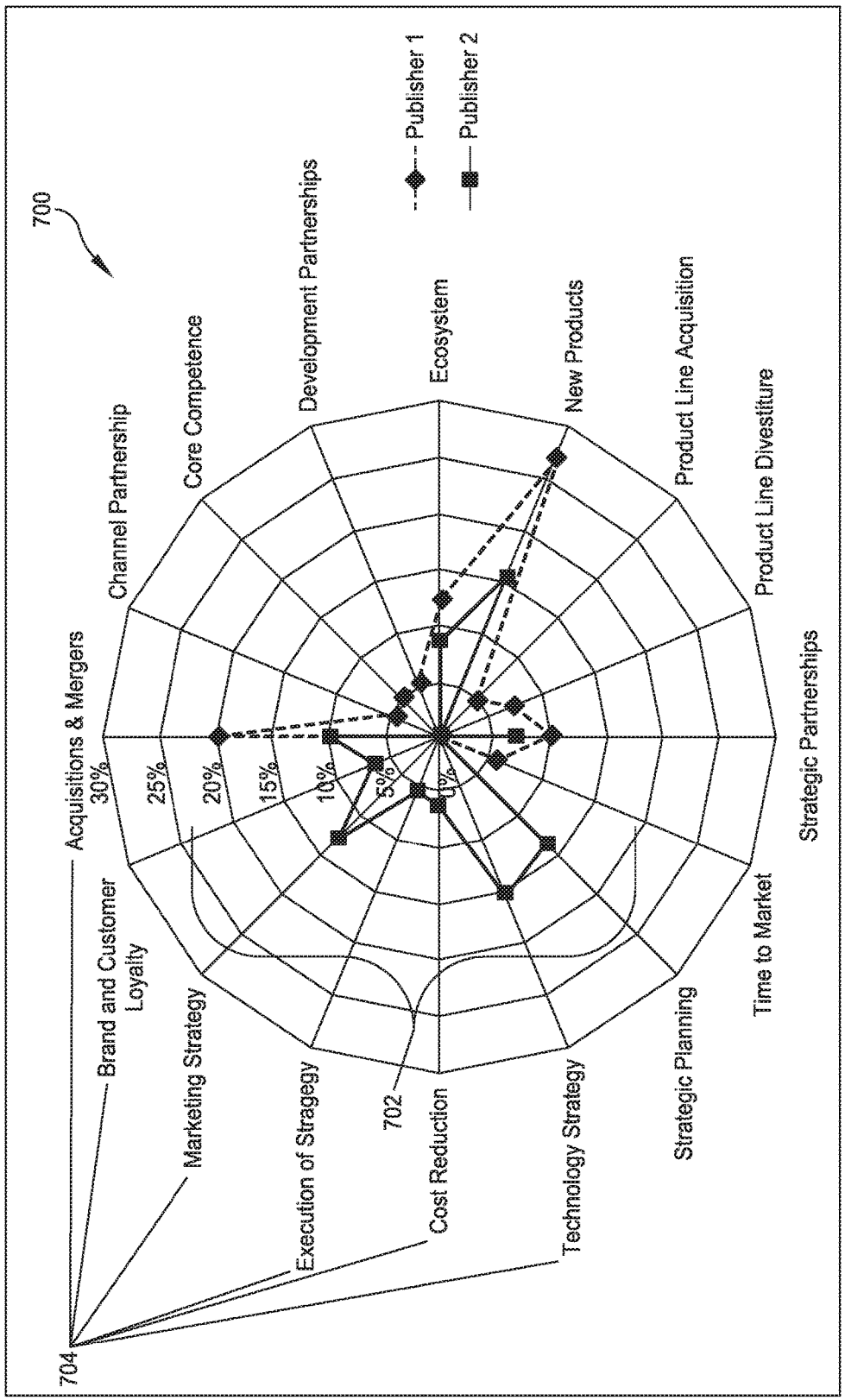
FIG. 7 is another visual representation generated by a coverage analytics system.
Figure 8:
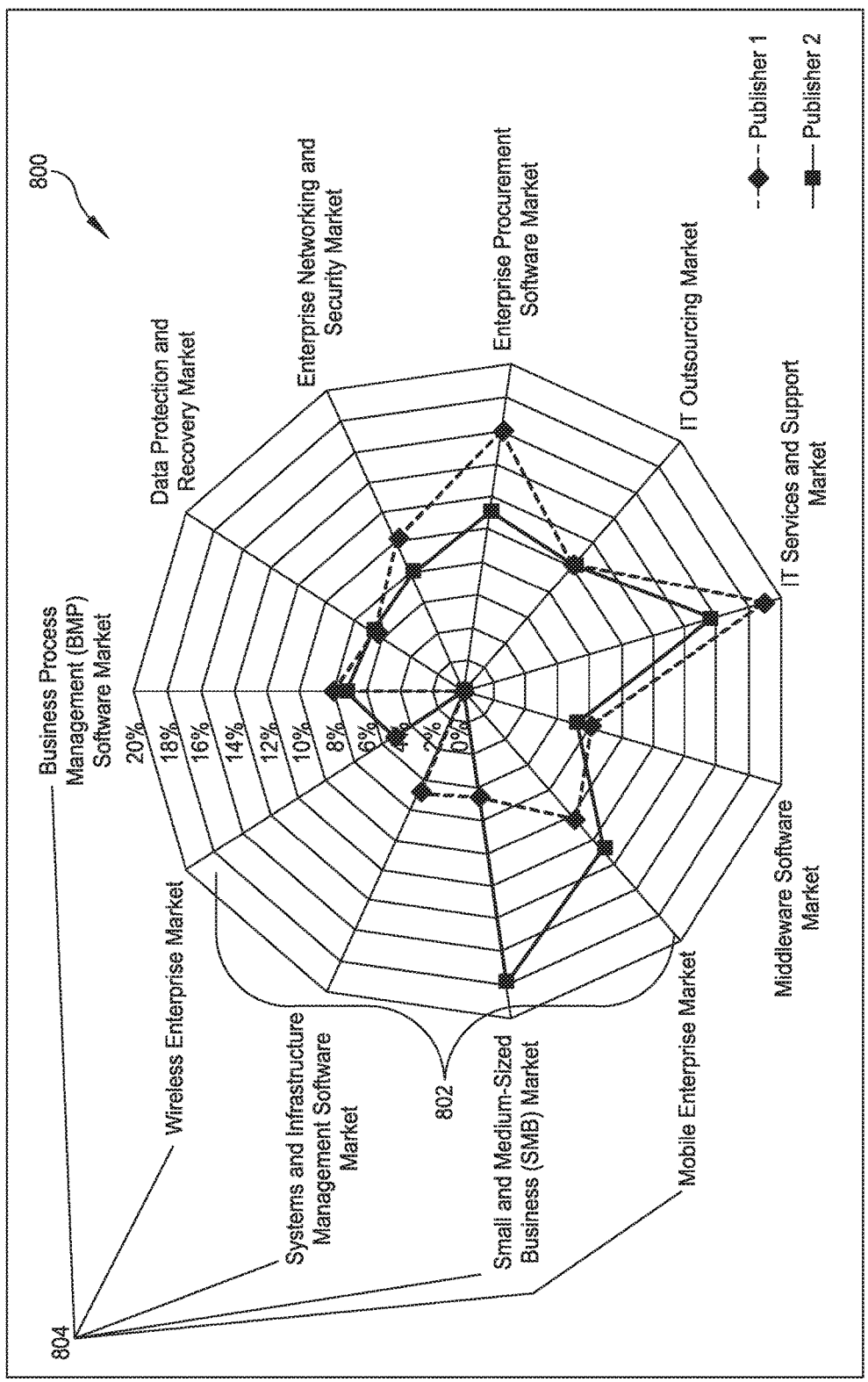
FIG. 8 is another visual representation generated by a coverage analytics system.

In some embodiments, the user interface 136 is configured to receive input from the user requesting access to content summaries associated with meaning loaded entities of interest to the user 110, such as the content summaries 130 and 132. When executing according to this configuration, the user interface 136 responds to the input requesting access to the content summaries by accessing the summary information stored in the content summaries 130 and 132 held in the summary data store 140 and rendering the summary information for display to the user. FIGS. 6-8 further illustrate some of the visual representations provided by the user interface 136.

Information may flow between the components illustrated in FIG. 1, or any of the elements, components and subsystems disclosed herein, using a variety of techniques. Such techniques include, for example, passing the information over a network using standard protocols, such as TCP/IP, HTTP, or HTTPS, passing the information between modules in memory and passing the information by writing to a file, database, data store, or some other nonvolatile data storage device, among others. In addition, pointers or other references to information may be transmitted and received in place of, in combination with, or in addition to, copies of the information. Conversely, the information may be exchanged in place of, in combination with, or in addition to, pointers or other references to the information. Other techniques and protocols for communicating information may be used without departing from the scope of the examples and embodiments disclosed herein.

Within the coverage analytics system 100, data may be stored in any logical construction capable of storing information on a computer readable medium including, among other structures, flat files, indexed files, search engine indexes, hierarchical databases, relational databases or object oriented databases. These data structures may be specifically configured to conserve storage space or increase data exchange performance. In addition, various examples organize the data into particularized and, in some cases, unique structures to perform the functions disclosed herein. In these examples, the data structures are sized and arranged to store values for particular types of data, such as integers, floating point numbers, character strings, arrays, linked lists, and the like.

Computer System

As discussed above with regard to FIG. 1, various aspects and functions described herein may be implemented as specialized hardware or software components executing in one or more computer systems. There are many examples of computer systems that are currently in use. These examples include, among others, network appliances, personal computers, workstations, mainframes, networked clients, servers, media servers, application servers, database servers, and web servers. Other examples of computer systems may include mobile computing devices (e.g., smart phones, tablet computers, and personal digital assistants) and network equipment (e.g., load balancers, routers, and switches). Examples of particular models of mobile computing devices include iPhones, iPads, and iPod touches running iOS operating system available from Apple, Android devices like Samsung Galaxy Series, LG Nexus, and Motorola Droid X, Blackberry devices available from Blackberry Limited, and Windows Phone devices. Further, aspects may be located on a single computer system or may be distributed among a plurality of computer systems connected to one or more communications networks.

For example, various aspects, functions, and processes may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, embodiments are not limited to executing on any particular system or group of systems. Further, aspects, functions, and processes may be implemented in software, hardware or firmware, or any combination thereof. Thus, aspects, functions, and processes may be implemented within methods, acts, systems, system elements and components using a variety of hardware and software configurations, and examples are not limited to any particular distributed architecture, network, or communication protocol.

Figure 2:
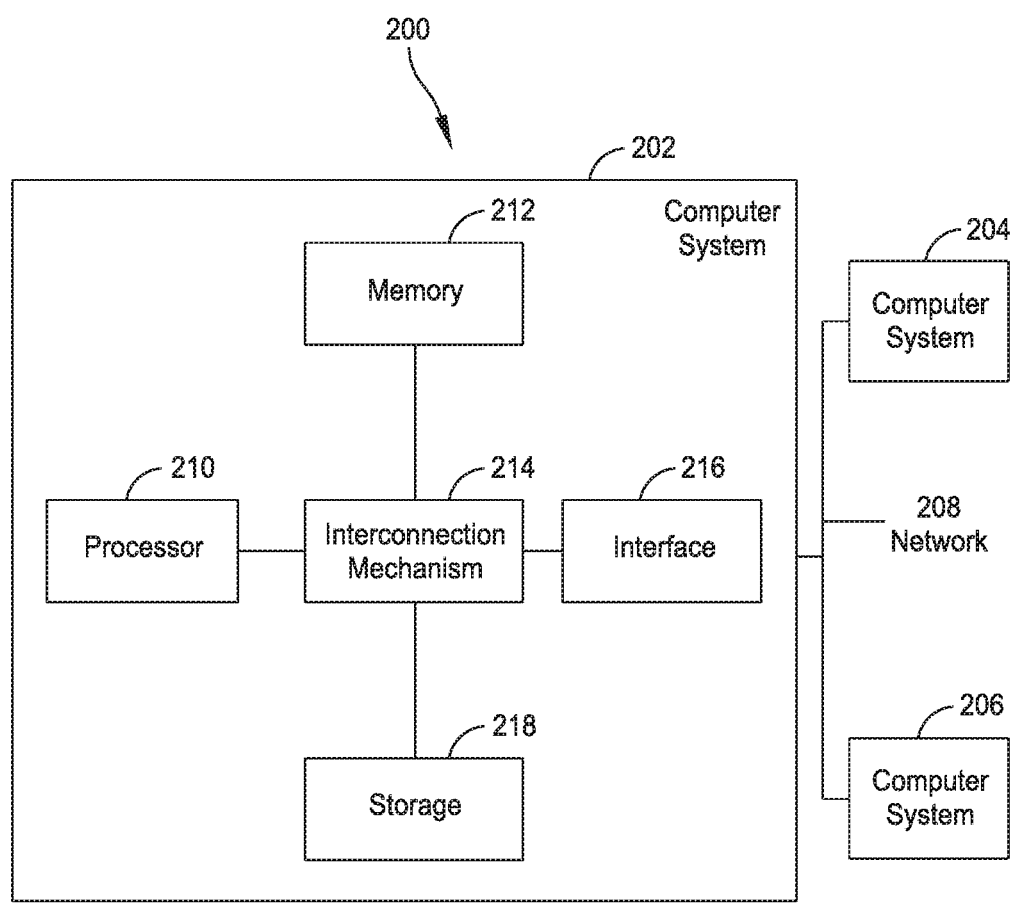
FIG. 2 is a schematic diagram of a computer system.

Referring to FIG. 2, there is illustrated a block diagram of a distributed computer system 200, in which various aspects and functions are practiced. As shown, the distributed computer system 200 includes one or more computer systems that exchange information. More specifically, the distributed computer system 200 includes computer systems 202, 204, and 206. As shown, the computer systems 202, 204, and 206 are interconnected by, and may exchange data through, a communication network 208. The network 208 may include any communication network through which computer systems may exchange data. To exchange data using the network 208, the computer systems 202, 204, and 206 and the network 208 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST, and Web Services. To ensure data transfer is secure, the computer systems 202, 204, and 206 may transmit data via the network 208 using a variety of security measures including, for example, SSL or VPN technologies. While the distributed computer system 200 illustrates three networked computer systems, the distributed computer system 200 is not so limited and may include any number of computer systems and computing devices, networked using any medium and communication protocol.

As illustrated in FIG. 2, the computer system 202 includes a processor 210, a memory 212, an interconnection element 214, an interface 216 and data storage element 218. To implement at least some of the aspects, functions, and processes disclosed herein, the processor 210 performs a series of instructions that result in manipulated data. The processor 210 may be any type of processor, multiprocessor or controller. Example processors may include a commercially available processor such as an Intel Xeon, Itanium, Core, Celeron, or Pentium processor; an AMD Opteron processor; an Apple A4 or A5 processor; a Sun UltraSPARC processor; an IBM Power5+ processor; an IBM mainframe chip; or a quantum computer. The processor 210 is connected to other system components, including one or more memory devices 212, by the interconnection element 214.

The memory 212 stores programs (e.g., sequences of instructions coded to be executable by the processor 210) and data during operation of the computer system 202. Thus, the memory 212 may be a relatively high performance, volatile, random access memory such as a dynamic random access memory ("DRAM") or static memory ("SRAM"). However, the memory 212 may include any device for storing data, such as a disk drive or other nonvolatile storage device. Various examples may organize the memory 212 into particularized and, in some cases, unique structures to perform the functions disclosed herein. These data structures may be sized and organized to store values for particular data and types of data.

Components of the computer system 202 are coupled by an interconnection element such as the interconnection element 214. The interconnection element 214 may include any communication coupling between system components such as one or more physical busses in conformance with specialized or standard computing bus technologies such as IDE, SCSI, PCI and InfiniBand. The interconnection element 214 enables communications, including instructions and data, to be exchanged between system components of the computer system 202.

The computer system 202 also includes one or more interface devices 216 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 202 to exchange information and to communicate with external entities, such as users and other systems.

The data storage element 218 includes a computer readable and writeable nonvolatile, or non-transitory, data storage medium in which instructions are stored that define a program or other object that is executed by the processor 210. The data storage element 218 also may include information that is recorded, on or in, the medium, and that is processed by the processor 210 during execution of the program. More specifically, the information may be stored in one or more data structures specifically configured to conserve storage space or increase data exchange performance. The instructions may be persistently stored as encoded signals, and the instructions may cause the processor 210 to perform any of the functions described herein. The medium may, for example, be optical disk, magnetic disk or flash memory, among others. In operation, the processor 210 or some other controller causes data to be read from the nonvolatile recording medium into another memory, such as the memory 212, that allows for faster access to the information by the processor 210 than does the storage medium included in the data storage element 218. The memory may be located in the data storage element 218 or in the memory 212, however, the processor 210 manipulates the data within the memory, and then copies the data to the storage medium associated with the data storage element 218 after processing is completed. A variety of components may manage data movement between the storage medium and other memory elements and examples are not limited to particular data management components. Further, examples are not limited to a particular memory system or data storage system.

Although the computer system 202 is shown by way of example as one type of computer system upon which various aspects and functions may be practiced, aspects and functions are not limited to being implemented on the computer system 202 as shown in FIG. 2. Various aspects and functions may be practiced on one or more computers having a different architectures or components than that shown in FIG. 2. For instance, the computer system 202 may include specially programmed, special-purpose hardware, such as an application-specific integrated circuit ("ASIC") tailored to perform a particular operation disclosed herein. While another example may perform the same operation using a grid of several general-purpose computing devices running MAC OS System X with Intel processors and several specialized computing devices running proprietary hardware and operating systems.

The computer system 202 may be a computer system including an operating system that manages at least a portion of the hardware elements included in the computer system 202. In some examples, a processor or controller, such as the processor 210, executes an operating system. Examples of a particular operating system that may be executed include a Windows-based operating system, such as, Windows NT, Windows 2000 (Windows ME), Windows XP, Windows Vista, Windows Phone, or Windows 7 operating systems, available from the Microsoft Corporation, Android operating system available from Google, Blackberry operating system available from Blackberry Limited, a MAC OS System X operating system or an iOS operating system available from Apple, one of many Linux-based operating system distributions, for example, the Enterprise Linux operating system available from Red Hat Inc., a Solaris operating system available from Oracle Corporation, or a UNIX operating systems available from various sources. Many other operating systems may be used, and examples are not limited to any particular operating system.

The processor 210 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, Ruby, Objective-C, SmallTalk, Java, C++, Ada, C# (C-Sharp), Python, or JavaScript. Other object-oriented programming languages may also be used. Alternatively, functional, scripting, or logical programming languages may be used.

Additionally, various aspects and functions may be implemented in a non-programmed environment. For example, documents created in HTML, XML or other formats, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements (e.g., specialized hardware, executable code, data structures or objects) that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

Coverage Analytics Processes

Figure 3:
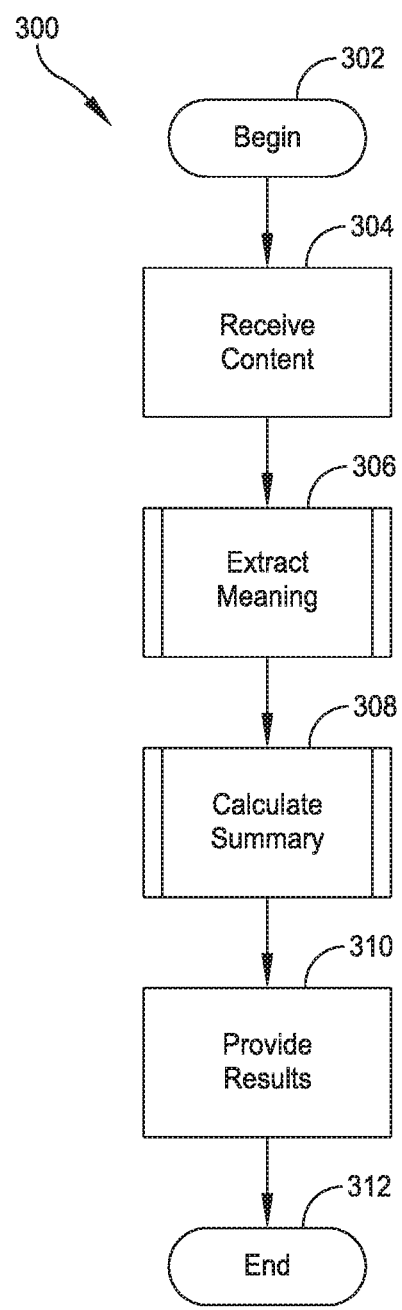
FIG. 3 is a flow diagram of a coverage analysis process executed by a coverage analytics system.
Figure 4:
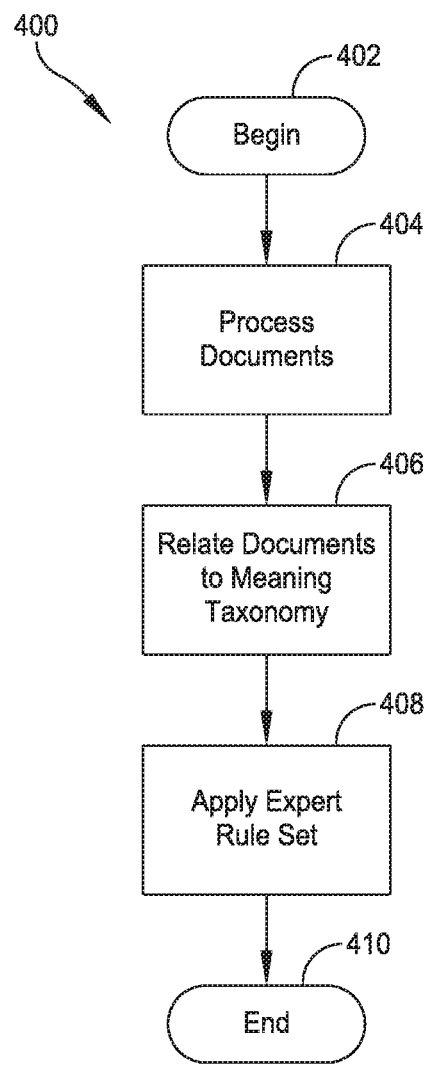
FIG. 4 is a flow diagram of a meaning extraction process executed by a coverage analytics system.
Figure 5:
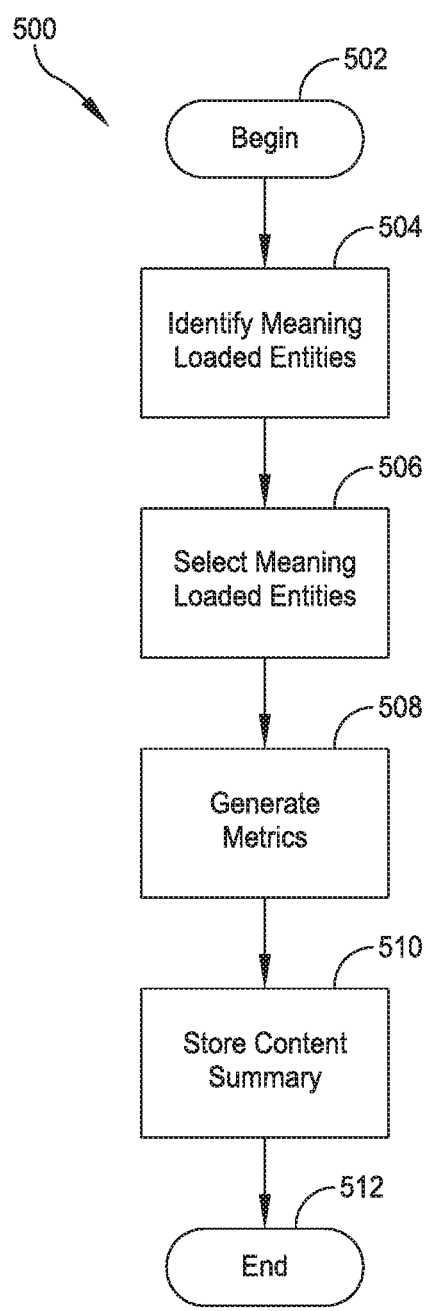
FIG. 5 is a flow diagram of a summary calculation process executed by a coverage analytics system.

FIGS. 3-5 illustrate example processes executed by coverage analytic systems. As described above with reference to FIG. 1, some embodiments include coverage analytics systems that execute coverage analysis processes. The coverage analytics systems that execute these processes may include a wide variety of computer systems, such as the coverage analytics system 100 described above with reference to FIG. 1. FIG. 3 illustrates an example coverage analysis process 300 in accord with the embodiments disclosed herein. As illustrated in FIG. 3, the coverage analysis process 300 includes receiving content, extracting meaning, calculating coverage, and providing results. The coverage analysis process 300 begins at 302.

In act 304, content is received. The content may include documents containing a plurality of syntactic structures. In at least one embodiment, the content is received by coverage analytics system and provided to a meaning extraction engine, such as the meaning extraction engine 126 described above with reference to FIG. 1.

In act 306, meaning is extracted from the content. This extracted meaning may take the form of associations between documents included within the content and one or more meaning loaded entities defined within the meaning taxonomy 128. In at least one embodiment, the meaning is extracted by the meaning extraction engine. In this embodiment, the meaning extraction engine executes a process in accord with the meaning extraction process 400 described below with reference to FIG. 4.

In act 308, summary metrics are calculated. These summary metrics may include, for example, a total number of documents that address an identified meaning loaded entity for each source and a percentage of all documents generated by each source that address an identified meaning loaded entity. Other examples of summary metrics include numbers of occurrences of meaning loaded entities and trends over time of occurrences of meaning loaded entities by document, document count, or occurrences. In at least one embodiment the summary metrics are calculated by a summarization engine, such as the summarization engine 138 described above with reference to FIG. 1. In this embodiment, the summarization engine executes a process in accord with the summary calculation process 500 described below with reference to FIG. 5.

In act 310, summary information including the summary metrics is provided to an external entity, such as the user 110 described above with reference to FIG. 1. The visual representation used to provide the summary information may vary between embodiments. Specific examples of visual representations implemented by various embodiments are described further below with reference to FIGS. 6-8.

The coverage analysis process 300 ends at 312. Processes in accord with the coverage analysis process 300 enable coverage analytic systems to identified meaning loaded entities addressed in content and determine the depth of coverage afforded these meaning loaded entities by distinct sources.

As described above with reference to FIG. 3, in some embodiments, the coverage analytics system executes a meaning extraction process via the meaning extraction engine. FIG. 4 illustrates an example meaning extraction process 400 in accord with the embodiments disclosed herein. As illustrated in FIG. 4, the meaning extraction process 400 includes processing content, associating the content to a meaning taxonomy, and applying expert rules. The meaning extraction process 400 begins at 402.

In act 404, content (e.g. one or more documents) is processed to determine and store its syntactic characteristics. For example, in one embodiment, the meaning extraction engine searches each document for the presence or absence of specific syntactic structures or common variations of the syntactic structures. In another embodiment, the meaning extraction engine produces a comprehensive text analytics database, as known to those of skill in the art.

In act 406, the content is associated with the meaning taxonomy. In some embodiments, the meaning extraction engine scans the content and associates distinct documents within the content with specific meaning loaded entities based inclusion of one or more syntactic structures or meaning loaded entities within the documents. In some embodiments, the act 406 is facilitated by a text analytics database generated in the act 404.

In act 408, the expert rules are applied to the content. In some embodiments, the meaning extraction engine evaluates one or more logical propositions included in the expert rules against documents included within the content. Based on the results of the logical propositions (e.g., the logical proposition evaluates to true), the meaning extraction engine associates distinct documents with a specific meaning loaded entities within the meaning taxonomy.

The meaning extraction process 400 ends at 412. Processes in accord with the meaning extraction process 400 enable coverage analytic systems to extract meaning from content for further analysis and summarization.

As described above with reference to FIG. 3, in some embodiments, the coverage analytics system executes a summary calculation process via a summarization engine, such as the summarization engine 138 described above with reference to FIG. 1. FIG. 5 illustrates an example summary calculation process 500 in accord with the embodiments disclosed herein. As illustrated in FIG. 5, the summary calculation process 500 includes identifying meaning loaded entities, selecting meaning loaded entities, generating summary metrics, and storing content summaries. The summary calculation process 500 begins at 502.

In act 504, meaning loaded entities addressed by the processed content are identified. For example, in one embodiment, the summarization engine identifies a plurality of meaning loaded entities based on some predefined identification criteria. These identification criteria may be based on characteristics of the meaning loaded entities or the content associated therewith. For example, the identification criteria may specify one or more content sources, one or more meaning loaded entities, one or more types of content, a minimum document size, a range of publication dates, a frequency with which the specified meaning loaded entities are address within the content (e.g., the number of occurrences within a document of the syntactic structure associated with the specified meaning loaded entities), an importance of the specified meaning loaded entities to the user, a rank order of the meaning loaded entities' frequency, and the like.

In act 506, the identified meaning loaded entities and their associated content are selected for further analysis. For example, in one embodiment, the summarization engine ranks the meaning loaded entities by one or more values of one or more characteristics of the meaning loaded entities or the content associated therewith. These ranking characteristics may include the same characteristics used to identify the meaning loaded entities or may include additional characteristics. Next, in the act 506, the summarization engine selects meaning loaded entities that match predefined selection criteria for additional processing. These selection criteria may specify values of ranking characteristics or other characteristics of the meaning loaded entities or their associated content.

In act 508, the metrics descriptive of the meaning loaded entities and the content associated therewith are generated. In some embodiments, the summarization engine generates metrics based on the values of the ranking characteristics. For example, in at least one embodiment, the summarization engine generates a percentage metric for each meaning loaded entity that indicates the percentage of documents that address the meaning loaded entity relative to the total number of documents selected in the act 506. In act 510, the coverage analytics system stores a content summary including the generated metrics and supporting information required to render a visual representation, such as the visual representations described below with referenced to FIGS. 6-8. Visual representations of generated metrics may communicate metric characteristics such as a value of a metric, a metric's values as a function of time (e.g., whether the metric's values were increasing, decreasing, or static), and a metric's value relative to a benchmark (e.g., an average value of a metric calculated from for all content sources).

The summary calculation process 500 ends at 512. Processes in accord with the summary calculation process 500 enable coverage analytic systems to quantify the treatment various content sources are giving a variety of concepts key to particular information domains.

Processes 300, 400, and 500 each depict one particular sequence of acts in a particular embodiment. The acts included in these processes may be performed by, or using, one or more computer systems specially configured as discussed herein. Some acts are optional and, as such, may be omitted in accord with one or more embodiments. Additionally, the order of acts can be altered, or other acts can be added, without departing from the scope of the embodiments described herein. Furthermore, as described above, in at least one embodiment, the acts are performed on particular, specially configured machines, namely a coverage analytics system configured according to the examples and embodiments disclosed herein.

User Interface Components and Additional Embodiments

FIGS. 6-8 illustrate example interface components provided by a user interface, such as the user interface 136 described above with reference to FIG. 1, of a coverage analytics system, such as the coverage analytics system 100 described above with reference to FIG. 1, according to various embodiments. It is appreciated that other interface elements may be provided, and embodiments described herein are not limited to a particular interface element, object, screen, or set of screens. FIG. 6 illustrates a radar chart 600 displaying summary metrics 602 for selected information technology related meaning loaded entities 604. In this example, the summary metrics 602 indicate a depth of coverage for each meaning loaded entities 604 provided by Publisher 1 and Publisher 2.

The processing required by the coverage analytics system to provide in the visual representation illustrated in FIG. 6 may occur as follows. Initially, Publisher 1 and Publisher 2 generate content regarding a plurality of information technology concepts. This content is stored in a content data store, such as the content data store 106 described above with reference to FIG. 1. Next, the coverage analytics system executes a process in accord with the process 300 in which the coverage analytics system receives the content, extracts meaning from the content, calculates summaries of the meaning, and provides results (e.g., the radar chart 600) to an external entity.

In extracting meaning from the content, the coverage analytics system instantiates a meaning extraction engine, such as the meaning extraction engine 126 described above with reference to FIG. 1, and provides the content to the meaning extraction engine. The meaning extraction engine executes a meaning extraction process in accord with the process 400.

In calculating the summaries of the meaning, the coverage analytics system instantiates a summarization engine, such as the summarization engine 138 described above with reference to FIG. 1. The summarization engine executes a summary calculation process in accord with the process 500. In this example, the summarization engine identifies all content generated by Publisher 1 and Publisher 2 in the previous 12 months during execution of the act 504. During execution of the act 506, the summarization engine ranks, within each source, all of the meaning loaded entities that address information technology concepts by the number of documents addressing the meaning loaded entities and selects 10 meaning loaded entities with the highest number of supporting documents for additional processing. Next, during execution of the act 508, the summarization engine converts, within each source, the number of supporting documents addressing each meaning loaded entity to a percentage of the total number of documents selected in the act 506.

In providing results to an external entity, the user interface plots the summary metrics, here percentages, on a radar graph to show overlap and lack of overlap in the coverage provided by Publisher 1 and Publisher 2.

FIG. 7 illustrates a radar chart 700 displaying summary metrics 702 for selected corporate strategy related meaning loaded entities 704. In this example, the summary metrics 702 indicate a depth of coverage for each meaning loaded entities 704 provided by Publisher 1 and Publisher 2.

The processing required by the coverage analytics system to provide in the visual representation illustrated in FIG. 7 may occur as follows. Initially, Publisher 1 and Publisher 2 generate content regarding a plurality of corporate strategy concepts. This content is stored in a content data store, such as the content data store 106 described above with reference to FIG. 1. Next, the coverage analytics system executes a process in accord with the process 300 in which the coverage analytics system receives the content, extracts meaning from the content, calculates summaries of the meaning, and provides results (e.g., the radar chart 700) to an external entity.

In extracting meaning from the content, the coverage analytics system instantiates a meaning extraction engine, such as the meaning extraction engine 126 described above with reference to FIG. 1, and provides the content to the meaning extraction engine. The meaning extraction engine executes a meaning extraction process in accord with the process 400.

In calculating the summaries of the meaning, the coverage analytics system instantiates a summarization engine, such as the summarization engine 138 described above with reference to FIG. 1. The summarization engine executes a summary calculation process in accord with the process 500. In this example, the summarization engine identifies all content generated by Publisher 1 and Publisher 2 in the previous 12 months during execution of the act 504. During execution of the act 506, the summarization engine ranks, within each source, all of the meaning loaded entities that address corporate strategy concepts by the number of documents addressing the meaning loaded entities and selects 10 meaning loaded entities with the highest number of supporting documents for additional processing. Next, during execution of the act 508, the summarization engine converts, within each source, the number of supporting documents addressing each meaning loaded entity to a percentage of the total number of documents selected in the act 506.

In providing results to an external entity, the user interface plots the summary metrics, here percentages, on a radar graph to show overlap and lack of overlap in the coverage provided by Publisher 1 and Publisher 2.

FIG. 8 illustrates a radar chart 800 displaying summary metrics 802 for selected IT product market related meaning loaded entities 804. In this example, the summary metrics 802 indicate a depth of coverage for each meaning loaded entities 804 provided by Publisher 1 and Publisher 2.

The processing required by the coverage analytics system to provide in the visual representation illustrated in FIG. 8 may occur as follows. Initially, Publisher 1 and Publisher 2 generate content regarding a plurality of IT product market concepts. This content is stored in a content data store, such as the content data store 106 described above with reference to FIG. 1. Next, the coverage analytics system executes a process in accord with the process 300 in which the coverage analytics system receives the content, extracts meaning from the content, calculates summaries of the meaning, and provides results (e.g., the radar chart 800) to an external entity.

In extracting meaning from the content, the coverage analytics system instantiates a meaning extraction engine, such as the meaning extraction engine 126 described above with reference to FIG. 1, and provides the content to the meaning extraction engine. The meaning extraction engine executes a meaning extraction process in accord with the process 400.

In calculating the summaries of the meaning, the coverage analytics system instantiates a summarization engine, such as the summarization engine 138 described above with reference to FIG. 1. The summarization engine executes a summary calculation process in accord with the process 500. In this example, the summarization engine identifies all content generated by Publisher 1 and Publisher 2 in the previous 12 months during execution of the act 504. During execution of the act 506, the summarization engine ranks, within each source, all of the meaning loaded entities that address IT product market concepts by the number of documents addressing the meaning loaded entities and selects 10 meaning loaded entities with the highest number of supporting documents for additional processing. Next, during execution of the act 508, the summarization engine converts, within each source, the number of supporting documents addressing each meaning loaded entity to a percentage of the total number of documents selected in the act 506.

In providing results to an external entity, the user interface plots the summary metrics, here percentages, on a radar graph to show overlap and lack of overlap in the coverage provided by Publisher 1 and Publisher 2.

A coverage analytics system may process content generated from a wide variety of entities that address a wide range of meaning loaded entities. Examples of sources and meaning loaded entities that may be analyzed include: universities and research grants by academic area, syndicated market research reports, news feeds, scientific journal article databases, conference presentation databases, white papers on any topic by any set or organizations, press release databases, websites, and social media feeds. Each of these sources and meaning loaded entities may be analyzed and visualized using the embodiments described herein and thus fall within the scope of the present disclosure.

Having thus described several aspects of at least one example, it is to be appreciated that various alterations, modifications, and improvements will readily occur to those skilled in the art. For instance, examples and embodiments disclosed herein may also be used in other contexts. Such alterations, modifications, and improvements are intended to be part of this disclosure, and are intended to be within the scope of the examples discussed herein. Accordingly, the foregoing description and drawings are by way of example only.

What is claimed is:

1. A system comprising:
   memory storing a meaning taxonomy including:
      a text analytics database;
      a plurality of meaning loaded entities; and
      a plurality of associations between the plurality of meaning loaded entities and a plurality of syntactic structures, each association of the plurality of associations linking at least one meaning loaded entity of the plurality of meaning loaded entities to at least one syntactic structure of the plurality of syntactic structures; and
   at least one processor in data communication with the memory, the processor configured to:
      receive first content from a first source, the first content including one or more first syntactic structures;
      identify, based at least in part on identification criteria, one or more first meaning loaded entities of the plurality of meaning loaded entities that are linked to the one or more first syntactic structures by one or more first associations of the plurality of associations, the identification criteria including at least one of a type of the first content, a document size of the first content, a publication date of the first content, and an importance of the one or more first meaning load entities;
      store, in the text analytics database, a mapping of the one or more first syntactic structures within the first content to the identified one or more first meaning loaded entities;
      calculate, based on the mapping in the text analytics database, a first content summary indicating a first level of coverage of the one or more first meaning loaded entities within the first content; and
      generate a first visual representation of the first content summary, the first visual representation comprising visual indicia that graphically represent a domain of the one or more first meaning loaded entities addressed in the first content and a level of coverage dedicated to each meaning loaded entity in the domain of meaning loaded entities addressed in the first content.

2. The system of claim 1, wherein the type of the first content is one of textual content, graphical content, and audio content.

3. The system of claim 1, wherein the first content includes a set of documents including the one or more first syntactic structures and the first content summary includes a depth of coverage of the one or more first meaning loaded entities within the set of documents.

4. The system of claim 3, wherein the set of documents includes at least one of white papers, presentations, news articles, press releases, market research reports, websites, and social media feeds.

5. The system of claim 3, wherein the first visual representation is a radar chart presenting the depth of coverage.

6. The system of claim 1, wherein the one or more components are further collectively configured to:
   receive second content from a second source, the second content including one or more second syntactic structures;
   identify one or more second meaning loaded entities of the plurality of meaning loaded entities that are linked to the one or more second syntactic structures by one or more second associations of the plurality of associations;
   store, in the text analytics database, a second mapping of the one or more second syntactic structures within the second content to the identified one or more second meaning loaded entities;
   calculate, based on the second mapping in the text analytics database, a second content summary indicating a second level of coverage of the one or more second meaning loaded entities within the second content; and
   provide a comparative representation that combines the first visual representation and a second representation of the second content summary to the external entity.

7. The system of claim 6, wherein the first content summary and the second content summary indicate a level of coverage of at least one common meaning loaded entity extracted from the first content and the second content.

8. The system of claim 7, wherein the one or more first syntactic structures and the one or more second syntactic structures share no common syntactic structures.

9. A method implemented using a computer system including memory and at least one processor coupled to the memory, the method comprising:
   storing, in the memory, a meaning taxonomy including:
      a plurality of meaning loaded entities; and
      a plurality of associations between the plurality of meaning loaded entities and a plurality of syntactic structures, each association of the plurality of associations linking at least one meaning loaded entity of the plurality of meaning loaded entities to at least one syntactic structure of the plurality of syntactic structures;
   receiving first content from a first source, the first content including one or more first syntactic structures;
   identifying, based at least in part on identification criteria, one or more first meaning loaded entities of the plurality of meaning loaded entities that are linked to the one or more first syntactic structures by one or more first associations of the plurality of associations, the identification criteria including at least one of a type of the first content, a document size of the first content, a publication date of the first content, and an importance of the one or more first meaning load entities;

storing, in a text analytics database, a mapping of the one or more first syntactic structures within the first content to the identified one or more first meaning loaded entities;

calculating, based on the mapping in the text analytics database, a first content summary indicating a first level of coverage of the one or more first meaning loaded entities within the first content; and generating, by the at least one processor, a first visual representation of the first content summary, the first visual representation comprising visual indicia that graphically represent a domain of the one or more meaning loaded entities addressed in the first content and a level of coverage dedicated to each meaning loaded entity.

10. The method of claim 9, wherein the type of the first content is one of textual content, graphical content, and audio content.

11. The method of claim 9, wherein receiving the first content includes receiving a set of documents including the one or more syntactic structures and calculating the first content summary includes calculating a depth of coverage of the one or more first meaning loaded entities within the set of documents.

12. The method of claim 11, wherein receiving the set of documents includes receiving at least one of white papers, presentations, news articles, press releases, market research reports, websites, and social media feeds.

13. The method of claim 9, wherein the first visual representation is a radar chart presenting the depth of coverage.

14. The method of claim 9, further comprising:

receiving second content from a second source, the second content including one or more second syntactic structures;

identifying one or more second meaning loaded entities of the plurality of meaning loaded entities that are linked to the one or more second syntactic structures by one or more second associations of the plurality of associations;

storing, in the text analytics database, a second mapping of the one or more second syntactic structures within the second content to the identified one or more second meaning loaded entities;

calculating, based on the second mapping in the text analytics database, a second content summary indicating a second level of coverage of the one or more second meaning loaded entities within the second content; and providing a comparative representation that combines the first visual representation and a second representation of the second content summary to the external entity.

15. The method of claim 14, wherein calculating the second content summary includes calculating a second content summary that indicates a level of coverage of at least one common meaning loaded entity extracted from the first content and the second content.

16. The method of claim 15, wherein identifying the one or more second meaning loaded entities includes identifying one or more second meaning loaded entities that are linked to one or more second syntactic structures that share no common syntactic structures with the one or more first syntactic structures.

17. A non-transitory computer readable medium storing sequences of instruction for analyzing coverage of concepts within content, the sequences of instruction including computer executable instructions that instruct at least one processor to:

store, in a memory in data communication with the at least one processor, a meaning taxonomy including:
a plurality of meaning loaded entities; and
a plurality of associations between the plurality of meaning loaded entities and a plurality of syntactic structures, each association of the plurality of associations linking at least one meaning loaded entity of the plurality of meaning loaded entities to at least one syntactic structure of the plurality of syntactic structures;

receive first content from a first source, the first content including one or more first syntactic structures;

identify, based at least in part on identification criteria, one or more first meaning loaded entities of the plurality of meaning loaded entities that are linked to the one or more first syntactic structures by one or more first associations of the plurality of associations, the identification criteria including at least one of a type of the first content, a document size of the first content, a publication date of the first content, and an importance of the one or more first meaning load entities;

store, in a text analytics database, a mapping of the one or more first syntactic structures within the first content to the identified one or more first meaning loaded entities;

calculate, based on the mapping in the text analytics database, a first content summary indicating a first level of coverage of the one or more first meaning loaded entities within the first content; and generate a first visual representation of the first content summary, the first visual representation comprising visual indicia that graphically represent a domain of the first one or more meaning loaded entities in the first content and a level of coverage dedicated to each meaning loaded entity.

18. The computer readable medium of claim 17, wherein the first content includes a set of documents including the one or more syntactic structures and the first content summary includes a depth of coverage of the one or more first meaning loaded entities within the set of documents.

19. The computer readable medium of claim 18, wherein the set of documents includes at least one of white papers, presentations, news articles, press releases, market research reports, websites, and social media feeds.

20. The computer readable medium of claim 17, wherein the instructions further instruct the at least one processor to:

receive second content from a second source, the second content including one or more second syntactic structures;

identify one or more second meaning loaded entities of the plurality of meaning loaded entities that are linked to the one or more second syntactic structures by one or more second associations of the plurality of associations;

store, in the text analytics database, a second mapping of the one or more second syntactic structures within the second content to the identified one or more second meaning loaded entities;

calculate, based on the second mapping in the text analytics database, a second content summary indicating a second level of coverage of the one or more second meaning loaded entities within the second content; and provide a comparative representation that combines the first visual representation and a second representation of the second content summary to the external entity.

* * * * *